United States Patent
Tanaka et al.

(10) Patent No.: US 8,004,766 B2
(45) Date of Patent: Aug. 23, 2011

(54) ILLUMINATING DEVICE, ILLUMINATING METHOD, IMAGE SIGNAL PROCESSING DEVICE, IMAGE SIGNAL PROCESSING METHOD, AND IMAGE PROJECTING APPARATUS

(75) Inventors: Kazumasa Tanaka, Chiba (JP); Tetsujiro Kondo, Tokyo (JP); Yasushi Tatehira, Kanagawa (JP); Tetsushi Kokubo, Kanagawa (JP); Kenji Tanaka, Kanagawa (JP); Hitoshi Mukai, Kanagawa (JP); Hirofumi Hibi, Kanagawa (JP); Hiroyuki Morisaki, Tokyo (JP)

(73) Assignee: Sony Corporation, Tokyo (JP)

( * ) Notice: Subject to any disclaimer, the term of this patent is extended or adjusted under 35 U.S.C. 154(b) by 178 days.

(21) Appl. No.: 12/352,805

(22) Filed: Jan. 13, 2009

(65) Prior Publication Data

US 2009/0201588 A1   Aug. 13, 2009

(30) Foreign Application Priority Data

Feb. 8, 2008  (JP) ................................ 2008-029363

(51) Int. Cl.
*G02B 27/10* (2006.01)
*G03B 27/54* (2006.01)
(52) U.S. Cl. ........ 359/619; 359/618; 359/634; 359/823; 359/800; 355/67; 355/71; 362/268

(58) Field of Classification Search .......... 359/618–621, 359/625–629, 634, 637, 558, 800, 823; 353/20, 353/30, 33, 37, 38, 97, 98, 102; 355/53, 355/67–71; 362/268; 356/218, 327
See application file for complete search history.

(56) References Cited

U.S. PATENT DOCUMENTS

| | | | | |
|---|---|---|---|---|
| 4,988,188 A * | 1/1991 | Ohta | ............................. | 353/122 |
| 5,867,319 A * | 2/1999 | Sugiyama et al. | ............ | 359/618 |
| 6,211,944 B1 * | 4/2001 | Shiraishi | ......................... | 355/53 |
| 6,252,647 B1 * | 6/2001 | Shiraishi | ......................... | 355/53 |
| 6,560,044 B2 * | 5/2003 | Shinoda | ........................ | 359/800 |
| 6,563,567 B1 * | 5/2003 | Komatsuda et al. | ............ | 355/71 |
| 6,704,092 B2 * | 3/2004 | Shiraishi | ......................... | 355/53 |
| 6,710,855 B2 * | 3/2004 | Shiraishi | ......................... | 355/67 |
| 6,885,433 B2 * | 4/2005 | Shiraishi | ......................... | 355/67 |
| 6,897,942 B2 * | 5/2005 | Shiraishi | ......................... | 355/67 |
| 6,898,020 B2 * | 5/2005 | Ouchi | ........................... | 359/634 |
| 2007/0091270 A1 | 4/2007 | Akiyama | | |

* cited by examiner

*Primary Examiner* — Loha Ben
(74) *Attorney, Agent, or Firm* — Oblon, Spivak, McClelland, Maier & Neustadt, L.L.P.

(57) ABSTRACT

An illuminating device is provided. The illuminating device includes a light source, a dividing unit, an optical unit and a light-distribution control unit. The dividing unit is configured to divide light emitted from the light source into light beams. The optical unit is configured to allow at least one of a travelling direction and a focal length of the light beams divided by the dividing unit to be variable. The light-distribution control unit is configured to control at least one of the travelling direction and focal length of light beams by acting on the optical unit.

9 Claims, 18 Drawing Sheets

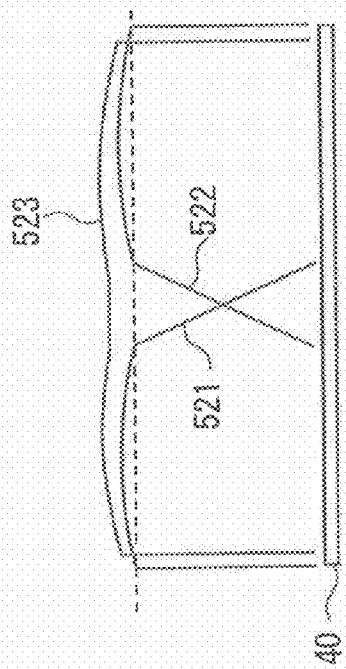
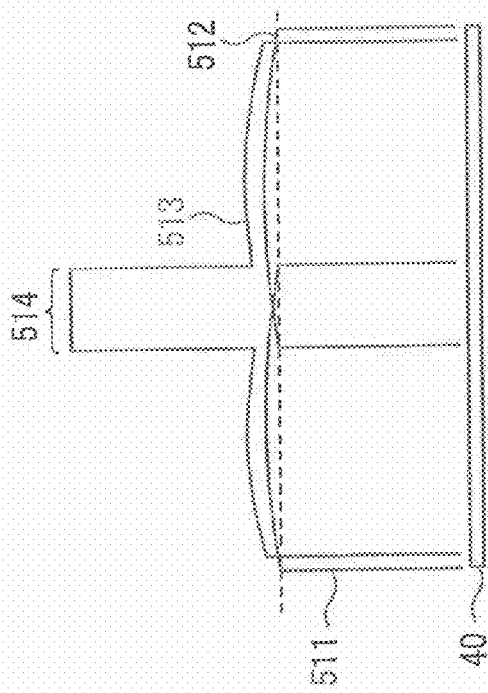
FIG. 4A PRIOR ART
FIG. 4B PRIOR ART

ILLUMINATING DEVICE, ILLUMINATING METHOD, IMAGE SIGNAL PROCESSING DEVICE, IMAGE SIGNAL PROCESSING METHOD, AND IMAGE PROJECTING APPARATUS

CROSS REFERENCES TO RELATED APPLICATIONS

The present invention contains subject matter related to Japanese Patent Application JP 2008-029363 filed in the Japanese Patent Office on Feb. 8, 2008, the entire contents of which being incorporated herein by reference.

BACKGROUND OF THE INVENTION

1. Field of the Invention

The present invention relates to an illuminating device to be used in a projector or the like that modulates light emitted from a light source by a light modulation device and projects the light on a screen to display an image thereon. The present invention also relates to an illuminating method using such an illuminating device. The present invention further relates to an image signal processing device and an image signal processing method, which employ the above illuminating device and the illuminating method. Still further, the present invention relates to an image projecting apparatus using the image signal processing device and image signal processing method.

2. Description of the Related Art

An image projecting apparatus such as a projector includes an illuminating device and a projector lens. The illuminating device illuminates a light modulation device such as a liquid crystal panel or DMD® (Digital Micromirror Device) with light. Then the projector lens projects the transmitted or reflected light from the light modulation device onto a screen. For the illumination optics of the related-art projector, an integrator optical system is employed to uniformly illuminate a light modulation device such as a liquid crystal panel with light from a light source. The light originally emitted from the light source has the nonuniformity of luminance. Thus, if the light is directly introduced into a light modulation device such as a liquid crystal panel, the nonuniformity of luminance is reflected on the panel and causes nonuniformity in luminance of an image projected. Therefore, for evenly projecting the image with uniform luminance, an integrator optical system that makes the luminance of light from the light source uniform has been used.

In general, the integrator optical system includes two lens arrays. The light from a light source passes through two lens arrays, followed by a light modulation device such as a liquid crystal panel being illuminated with a substantially uniform light distribution. Subsequently, the light passed through the light modulation device such as a liquid crystal panel is projected on a screen or the like by an optical projecting system, thereby projecting an image to the periphery of the screen with uniform luminance.

FIG. 1 is a schematic view illustrating an integrator optical system and its surrounding optical system in an image projecting apparatus typically used in the art. On the light path of light emitted from a light source 31 are arranged a first lens array 34, a second lens array 35, an optical system 36 including a focusing lens, a polarization converting element, and the like, and a light modulation device 37 such as a liquid crystal panel. The light emitted from the light source 31 is divided into light beams and incident on the first lens array 34. Then the divided light beams enter the second lens array 35. The light passed through the second lens array 35 is uniformly distributed and incident on the light modulation device 37 through the optical system 36 located downstream from the second lens array 35. As a result, the light beams divided by the first lens array 34 are overlapped with one another on the light modulation device 37, providing the entire light with uniform luminance.

FIG. 2 is a schematic view illustrating intensity distribution of light passing through an integrator optical system and light on the surface of a light modulation device. For instance, light with intensity a1 on the first lens of the first lens array 34 passes through the second lens array 35 and the light is then incident with intensity b1 on the light modulation device 37. Likewise, light with intensity a2 on the second lens of the first lens array 34 passes through the second lens array 35 and the light is then incident with intensity b2 on the light modulation device 37. In this manner, the light beams divided by the first lens array 34 are incident on the light modulation device 37 and then overlapped with one another, resulting in light with intensity b6 in total and almost uniform luminance from end to end of the light modulation device 37.

Japanese Unexamined Patent Application Publication No. 2007-114263 discloses a technology where light with uneven distribution of intensities emitted from a light source is converted into light with uniform distribution of intensities using two lens arrays. According to the technology disclosed in Japanese Unexamined Patent Application Publication No. 2007-114263, the production of an array of lenses with desirable shapes for the second lens array leads to overcome lacking in uniformity of light due to the configurations of the respective lenses, thereby forming an image with high luminance uniformly on the projected area of a screen or the like.

SUMMARY OF THE INVENTION

In the above integrator optical system, the light modulation device (e.g., liquid crystal panel) can be evenly illuminated with light. However, the uniform illumination of light at all times means the illumination with constant luminance regardless of the luminance of projecting images. Therefore, for projecting a dark image, the luminance of light has been controlled by shading part of the light using a physical device, a signal-processing device, or the like. Thus, light is unnecessarily given to the dark portion of the image, causing a decrease in utilization efficiency. In this case, furthermore, the light to be shaded could be also incident, causing heat in an optical component such as a liquid crystal panel in an undesirable manner. Thus, thermal degradation of such component may be caused.

In addition, as shown in FIG. 3, two or more projectors 51 and 52 may be disposed in parallel with each other and project images in parallel on a screen 40 to form a wider image thereon. In this case, a blending portion 41, where the images projected on the screen 40 from the respective projectors 51 and 52 adjacent to each other are overlapped, has an increased optical intensity compared with the other portion thereof. FIGS. 4A and 4B indicate examples of light intensity distribution where two or more projectors are disposed in parallel as mentioned above. As shown in FIG. 4A, light intensity distribution 513 is formed by overlapping light intensity distribution 511 of the image projected on the screen 40 from the projector 51 and light intensity distribution 512 of the image projected on the screen 40 from the projector 52. A blending portion 514 in the light intensity distribution 513 has an increased light intensity as compared with other portions. Therefore, as shown in FIG. 4B, according to the related art technology, light intensity distributions 521 and 522 to gradually reduce the luminance of the blending portion, so that combined light intensity distribution 523 is uniform. As a result, although the light is output from the light source to the blending portion, the corresponding part of the light can be lost due to the control of the optical intensities by shading or the like.

It is desirable to illuminate an object with light emitted from a light source with intended light intensity distribution, thereby enhancing the utilization efficiency of light.

According to an embodiment of the present invention, there is provided an illuminating device that includes a light source, a dividing unit, and an optical unit. The dividing unit is provided for dividing light emitted from the light source into light beams. The optical unit is provided for allowing at least one of a travelling direction and a focal length of the light beams divided by the dividing unit to be variable.

According to the embodiment of the present invention, the illuminating device can divide light emitted from the light source into light beams and then emit the respective light beams to corresponding areas on an illumination object.

The light beams corresponding to part of areas on the object are emitted to another area so as to obtain a desired light distribution on the object. Here, the term "light distribution" refers to the distribution of light intensity, so that the light distribution will mean "distribution of light intensity" or "light intensity distribution" hereinafter. According to another embodiment of the present invention, there is provided an image signal processing device. The device includes a light distribution database that defines variation of at least one of the travelling direction and focal length of divided beams of light emitted from a light source and distribution information about the luminance of incident light. The device further includes an image processing unit, a variation computing unit, and a control unit. The image processing unit is provided for determining bright and dark portions of an image projected. The variation computing unit is provided for computing variation of at least one of the travelling direction and focal length of divided light beams on the basis of both the information on bright and dark patterns of the image determined by the image processing unit and the information of the light distribution database. The control unit is provided for changing at least one of the travelling direction or focal length of divided beams of light emitted from the light source on the basis of variation computed by the variation computing unit.

At least one of the travelling direction or focal length of the divided beams of light emitted from the light source is changed to combine the light beams with light distribution corresponding to the bright and dark portions of an image and project the image. For example, the intensity of light emitted from the light source can be lowered corresponding to a dark portion of an image to be projected and a blending portion or the like or overlapped portions of images projected by two or more projectors. Then, the corresponding amount of light can be distributed to a bright portion. Therefore, according to an embodiment of the invention, light emitted from the light source can be incident on the object with intended light intensity distribution. The efficiency of using light can be enhanced, because there may be no need of shading light corresponding to the dark portion or the amount of light to be shaded may be controlled.

According to an embodiment of the present invention, light emitted from a light source can be incident on an object with a desired light intensity distribution, while lowering the amount of light to be shaded on the dark portion. Thus, the light can be efficiently used.

BRIEF DESCRIPTION OF THE DRAWINGS

FIGS. 4A and 4B are schematic views illustrating the light intensity of a blending portion in the related art, where FIG. 4A and FIG. 4B are different views of the blending portion, respectively.

FIG. 12A is a schematic view of example light beams passing through the lens arrays and FIG. 12B is an example of luminance distribution.

FIG. 13A is a schematic view of example light beams passing through the lens arrays in which only the second lens array is in a movable state and FIG. 13B is an example of luminance distribution.

FIG. 14A is a schematic view of example light beams passing through the lens arrays in which both the first and second lens arrays are in a movable state and FIG. 14B is an example of luminance distribution.

FIG. 15A is a schematic view of example light beams passing through the lens arrays and FIG. 15B is an example of luminance distribution.

DESCRIPTION OF THE PREFERRED EMBODIMENTS

Hereinafter, embodiments of the present invention will be described with reference to FIGS. 5-16 and 18.

Figure 5:
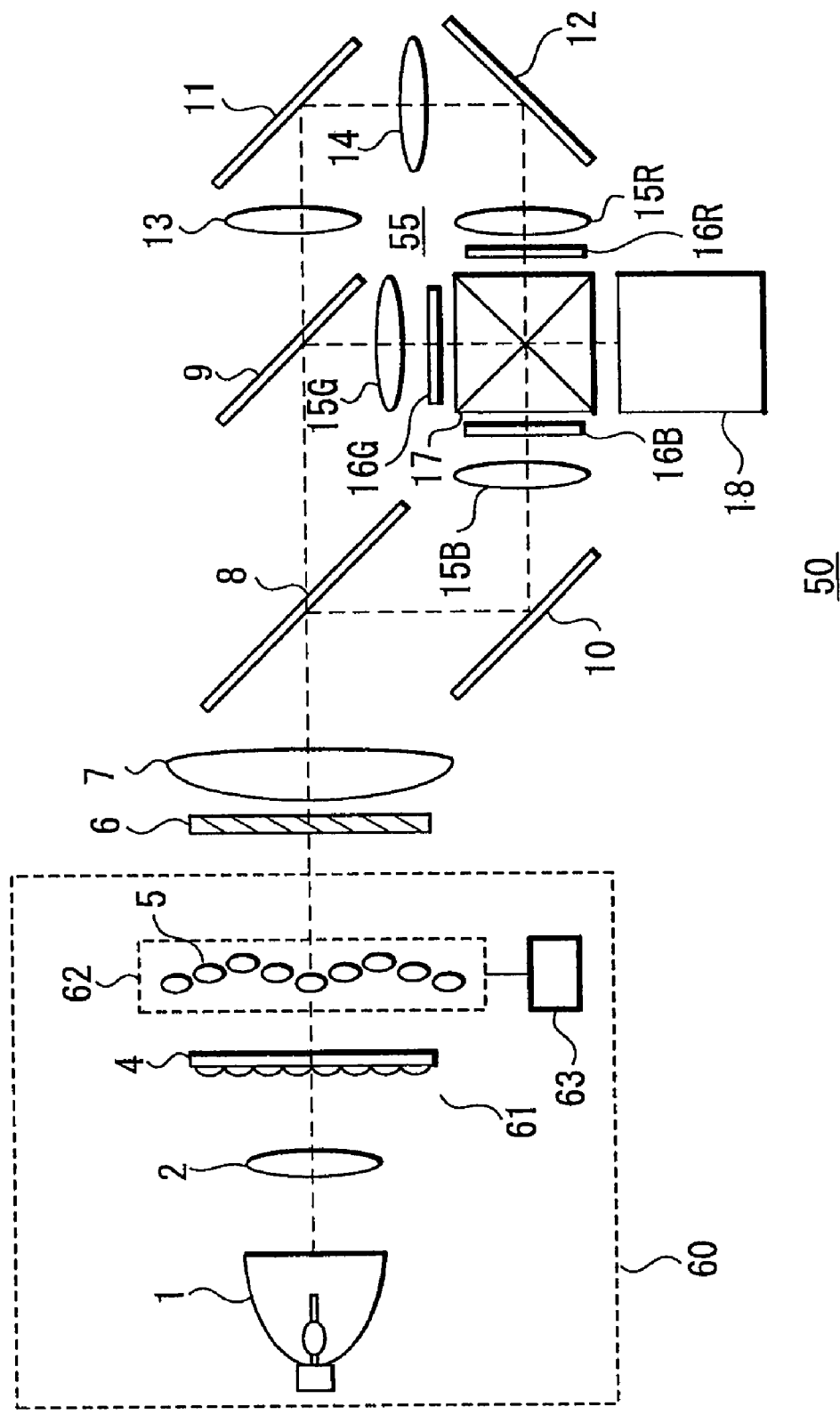
FIG. 5 is a schematic diagram illustrating an example configuration of an image projecting apparatus according to an embodiment of the present invention.

FIG. 5 illustrates a schematic configuration of an image projecting apparatus including an illuminating device in accordance with an embodiment of the present invention. In this example, for example, a transmissive liquid crystal panel may be used as a light modulation device. Alternatively, the light modulation device may be a reflective liquid crystal panel or the like. As shown in FIG. 5, an image projecting apparatus 50 includes an illuminating device 60. The illuminating device 60 includes a light source 1, a first lens array 4 as a dividing unit 61, a second lens array 5 constructed of a movable lens array or the like as an optical unit 62, a light-distribution control unit 63 that effects on the second lens array 5 to control at least one of the traveling direction of light divided by the first lens array 4 and the focal length of the second lens array 5. In this example, as shown FIG. 5, a collimator lens 2, the first lens array 4, and the second lens array 5 are coaxially arranged on the optical axis of the image projecting apparatus 50 and located on the light emitting side of the light source 1. Subsequently, a polarization converting element 6, a condenser lens 7, a first dichroic mirror 8, a second dichroic mirror 9, a lens 13, and a mirror 11 are arranged in this order on the optical axis of the image projecting apparatus 50. In contrast, a mirror 10 is arranged on the reflection side of the first dichroic mirror 8. In this case, for example, the mirror 10 changes the light path at a right angle. Then, a field lens 15B and a light modulation device (e.g., a liquid crystal panel as shown in the figure) 16B are arranged on the optical axis of the light path. Likewise, a field lens 15G and a light modulation device (such as a liquid crystal panel) 16G are arranged on the reflection side of the second dichroic mirror 9. Furthermore, a mirror 12 is arranged on the reflection side of the mirror 11 through a lens 14. The mirror 12 changes the light path at a right angle. Then, a field lens 15R and a light modulation device (such as a liquid crystal panel) 16R are arranged on the changed optical axis.

In this example, for example, the first dichroic mirror 8 is designed to transmit light at wavelength regions of red and green colors. In addition, for example, the second dichroic mirror 9 is designed to transmit light at a wavelength region of red color. Thus, a light modulation unit 55 can be constructed of the light modulation device 16R for red wavelength region, the light modulation device 16G for green wavelength region, and the light modulation device 16B for blue wavelength region on the divided respective optical paths. In addition, an optical projection unit is constructed of a cross prism 17 and a projector lens 18. The cross prism 17 is arranged so that it can face the light-emitting sides of the respective light modulation devices 16R, 16G, and 16B. Also, the projector lens 18 is arranged on the light-emitting side of the cross prism 17.

In the present embodiment, as described above, the first lens array 4 is provided as the dividing unit 61 that divides the light emitted from the light source 1 into light beams. In addition, the second lens array 5, which is constructed of an array of movable lenses, is provided as the optical unit 62 that makes movable at least one of the focal length and the traveling direction of light divided by the first lens array 4. The use of the movable lens array allows the positions and inclinations of the respective lenses of the second lens array 5 to be shifted from the focal points of the respective lenses of the first lens array 4, causing variations in the composite focal length and the amount of deviation of the lens. Therefore, the traveling direction and the output angle of light are variable, so that the distribution of light can be changed.

A movable part in the second lens array 5 may be a driving mechanism such as a three-axis actuator that allows the lens to move in the direction along the optical axis and two directions in the plane perpendicular to the optical axis. Further, a tilt driving mechanism that tilts the lens from the optical axis may be provided.

If the lenses of the second lens array 5 evenly arranged in the image projecting apparatus 50 of the present embodiment, for example, light emitted from the light source 1 is incident on the first lens array 4 to be divided into light beams and the divided light beams are then combined through the second lens array 5 and the like. Subsequently, the light modulation devices 16R, 16G, and 16B are illuminated with the light, projecting an image with uniform luminance on a screen, similarly to the related art.

On the other hand, a predetermined arrangement of lenses or the like in the second lens array 5 may allow the light modulation devices 16B, 16G, and 16R to be illuminated with the light with a desired light intensity distribution, not with the uniform luminance or the uniform light intensity distribution. Therefore, an image with desired light intensity distribution can be projected.

Figure 6:
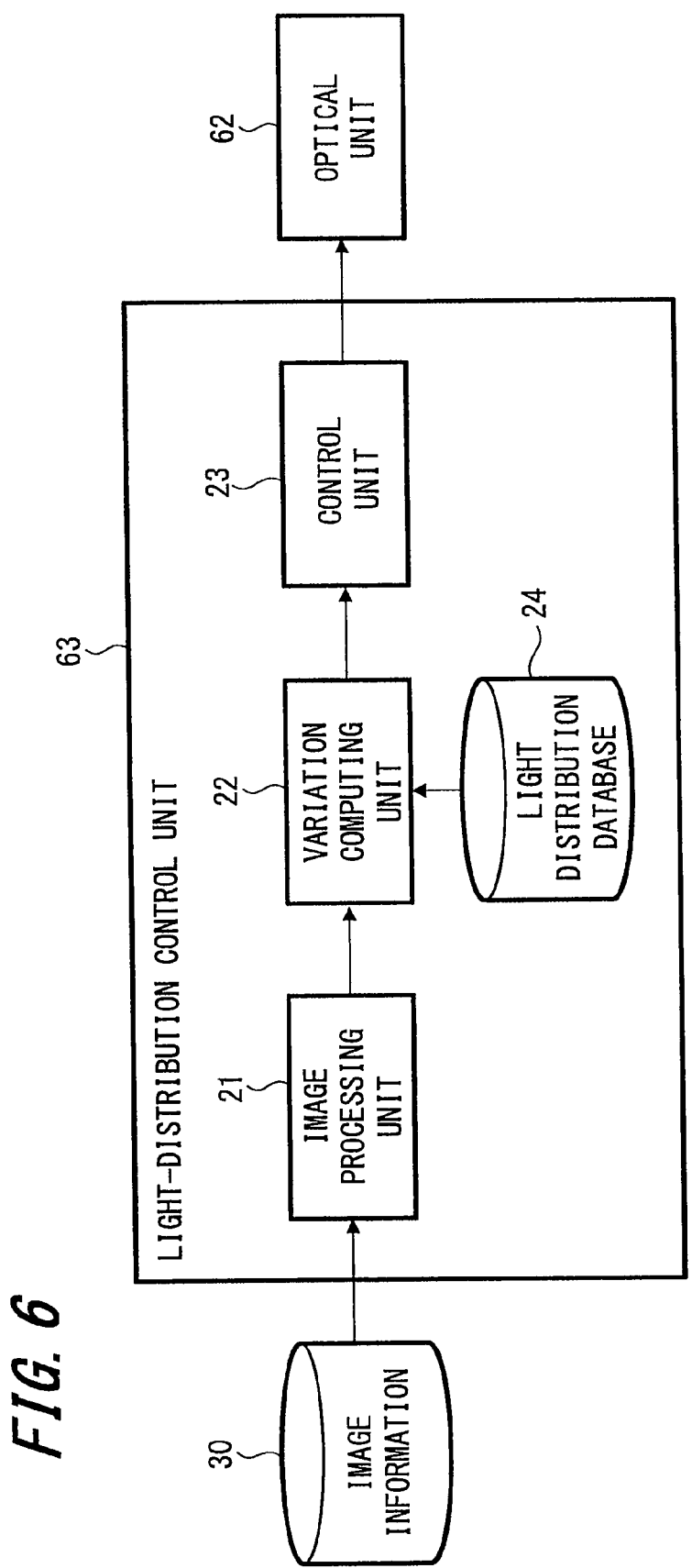
FIG. 6 is a block diagram illustrating an example configuration of a light-distribution control unit of an image projecting apparatus according to an embodiment of the present invention.

FIG. 6 is a block diagram illustrating an example configuration of the light-distribution control unit 63 according to the present embodiment. The configuration of the light-distribution control unit 63 of the present embodiment will be described with reference to FIG. 6. In this example, the light-distribution control unit 63 is responsible for moving each lens of the lens array 5 as the optical unit 62 forward and backward or right and left to control the traveling direction of light passing through the lens.

The light-distribution control unit 63 includes a light distribution database 24 that defines several items which should be previously defined. That is, the database 24 stores data that defines variations in positions of the respective lenses and mirrors in a lens array, mirror array, variable-focus lens array, and the like; variations in focal lengths of lenses in the variable-focus lens array; and the luminance distribution of incident light, or the intensity distribution thereof. The light-distribution control unit 63 includes an image processing unit 21 and a variation computing unit 22. The image processing unit 21 is responsible for determining the bright and dark portions of an image with the input of projecting-image information 30. The variation computing unit 22 is responsible for computing at least one of variations in travelling direction and focal length of light passing through the lens on the basis of the dark-and-light information (i.e., luminance information) determined by the image processing unit 21 and the information from the light distribution database 24. The light-distribution control unit 63 further includes a control unit 23 that shifts the positions of the respective lenses in the second lens array 5 in response to the variations computed by the variation computing unit 22. The light distribution database 24 stores a set of defined data including the data of variations in travelling direction of light corresponding to each lens and focal length thereof and the data of intensity distribution of illumination light under such variations. Here, these variations may be caused every minimum movable unit in a range of the minimum to maximum variations, for example, when the position of the lens is shifted forward or backward or shifted in right or left direction or when the lens is inclined with respect to the optical axis.

The light-distribution control unit 63 is constructed as described above and capable of changing the intensity distribution of illumination light on the liquid crystal panel by moving, for example, each lens in the optical unit 62 formed of the lens array or the like with reference to an image to be projected and then changing the travelling direction and focal length of light passing through the lens. The control of the intensity distribution of illumination light leads to an image with desired luminance distribution on an object illuminated such as a screen. In addition, the light-distribution control unit 63 repeats the above control processing at predetermined intervals when an image to be projected is video, thereby controlling the intensity of illumination light on a liquid crystal panel in response to the state of the image to be projected.

Figure 7:
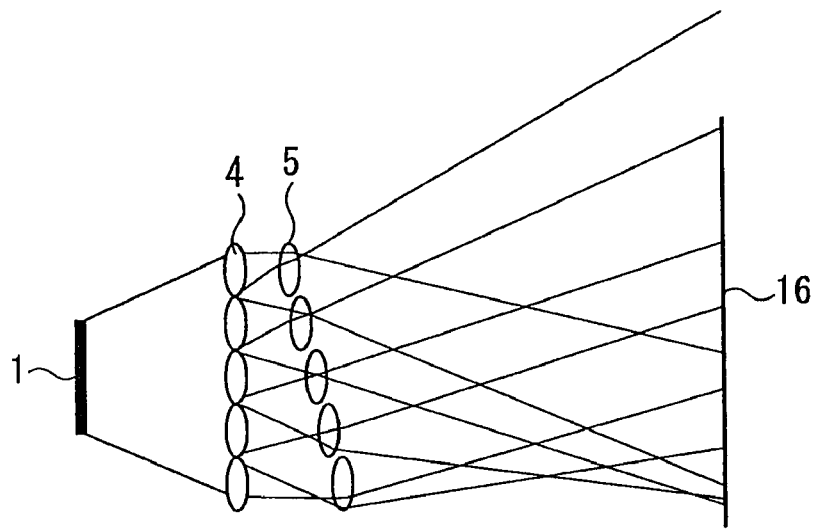
FIG. 7 is a schematic view illustrating an example movable state of a lens array included in an image projecting apparatus according to an embodiment of the present invention.
Figure 8:
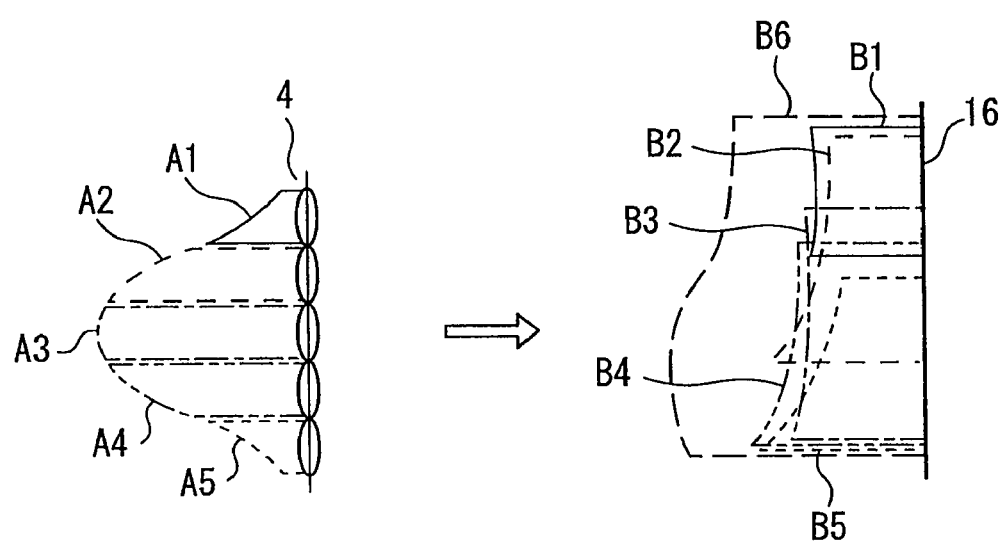
FIG. 8 is a schematic view illustrating an example light intensity distribution attained by a lens array included in an image projecting apparatus according to an embodiment of the present invention.

FIG. 7 is a schematic view illustrating an example of the movable conditions of the lens array in the illuminating device of the present embodiment. FIG. 8 illustrates an example of the intensity distribution of light. As shown in FIG. 7, there is represented an example distribution of light where an optical unit including a movable lens array is moved. For example, the lens position in the optical unit 62 can be shifted under the control of the light-distribution control unit 63 to optionally change the travelling direction or output angle of light passing through each lens. For example, as shown in FIG. 8, the light with light intensity A1 on the first lens of the first lens array 4 can be incident on the light modulation device 16 with intensity B1 after passing through the second lens array 5. Likewise, the light with intensities A2 to A5 on the second and subsequent lenses of the first lens array 4 can be incident on the light modulation device 16 at intensities B2 to B5 after passing through the second lens array 5. In this manner, the light is divided by the first lens array 4 into light beams. The travelling directions or output angles of the light beams are then varied by the second lens array 5. Subsequently, the light beams are incident on the light modulation device 16 and superimposed with one another, resulting in intensity B6 as a whole. At this time, the light intensity is not evenly distributed. It can be distributed in a desirable manner on the light modulation device 16. Thus, the light intensity can be adjusted to an appropriate one in response to the bright and dark patterns of an image to be projected. In FIG. 7, some of the light beams are directed to the outside of the light modulation device 16. The amount of such light directed to the outside can be adjusted by controlling the traveling amount or inclination of the lens. Such an adjustment may not shade the light output from the light source 1 to the dark portion of the image but allow the light to be distributed to other portions, allowing light to be efficiently used in the whole image. In addition, if an image with complicated luminance distribution is formed, the light modulation device 16 such as a liquid crystal panel may only adjust the level of luminance more finely. In this case, similarly, the utilization efficiency of light can be enhanced in comparison with the case of simply shading the light.

Figure 9:
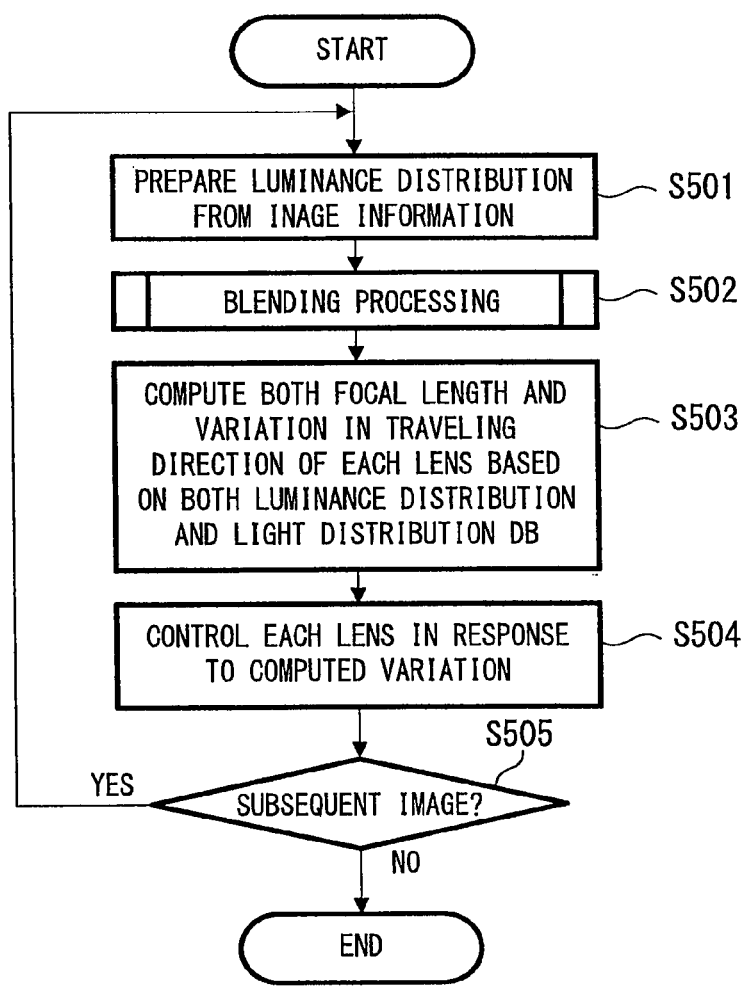
FIG. 9 is a flowchart illustrating a process of controlling the movement of a lens array included in an image projecting apparatus according to an embodiment of the present invention.

FIG. 9 is a flowchart that represents an example of the control processing of the light-distribution control unit 63 according to the present embodiment. Referring to FIG. 9, the contents of the controlling processing of the light distribution control unit 63 will be described. First, the image information of a projecting object is input and the input image information is then analyzed by the image processing unit 21 to determine light and dark portions on the screen to prepare the luminance distribution of an image (Step S501). For projecting images using a combination of two or more image projecting apparatuses placed side by side, processing for a blending portion where portions of projected images are overlapped with each other, which is referred to as the "blending processing" hereinafter, is carried out (Step S502). The contents of the blending processing are described with reference to FIG. 10. Subsequently, the variation computing unit 22 computes variations in focal length and travelling direction of each lens in the lens array by referring to the luminance distribution of the image and the light distribution database 24 (Step S503). Here, if there is a blending portion, then variations in focal length and travelling direction of each lens in the lens array are computed based on the modified luminance distribution of the image as a result of the blending processing shown in FIG. 10. Furthermore, the control unit 23 shifts the location of each lens in response to the computed variations (Step S504). Finally, it is determined whether subsequent images, such as moving images, are continuously present (Step S505). If there is a next image, then the step returns to the step S501 and the processing is then repeated. If there is no subsequent image, then the processing is terminated.

Figure 10:
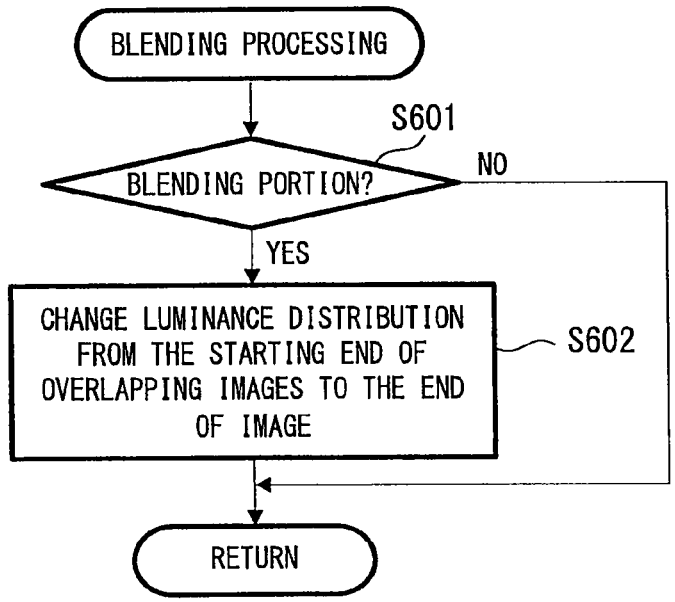
FIG. 10 is a flowchart illustrating blending processing carried out in the process shown in FIG. 9 in accordance with an embodiment of the present invention.

Referring to FIG. 10, an example of the blending processing will be described. First, it is determined whether there is a blending portion of the image overlapped with an image from another image projecting apparatus based on the input image information of the projecting object (Step S601). As a result of the determination, if there is any blending portion, then the distribution of luminance from the starting end of the overlapping to the end of the image is changed so that the luminance can be decreased smoothly in the luminance distribution prepared in the step S501 of the above processing (Step S602). Then, the processing returns to the processing shown in FIG. 9. If there is no blending portion as a result of the determination in the step S601, then the luminance distribution is not changed and the processing is then returned to the processing shown in FIG. 9. If the blending alone is carried out, then the luminance distribution of light may be prepared using the uniform light distribution but not using the image information in the step S501.

With the above processing, the luminance of light incident on the light modulation device such as a liquid crystal panel can be changed according to the bright and dark patterns of an image to be projected. Furthermore, in the case of projecting images from two or more image projecting apparatuses placed side by side, the luminance of the blending portion for each image projecting apparatus is lowered and the corresponding amount of light is then distributed to other portions, allowing an image to be projected with a desired light distribution.

In this example, the lenses of the second lens array 5 are designed to be movable and provided as an optical system for variable focal length and travelling direction of light output from the light source 1. Alternatively, the lenses of the first lens array 4 may be designed to be movable.

Furthermore, both the first lens array 4 and the second lens array 5 may be designed to be movable in sync with each other. In this case, the dividing unit 61 may also be provided with the functions of the optical unit 62. The configurations of the first and second movable lens arrays functioning as the dividing unit 61 and the optical unit 62 can alter the travelling direction and combined focal length of light beams divided more efficiently. Thus, the projecting object can be illuminated with light with a desired light distribution.

Furthermore, as another example of an optical unit, which is capable of changing the travelling direction and focal length of light, variable-focus lenses may be used as lenses forming a lens array. Specifically, the variable-focus lens may be a liquid crystal lens capable of changing the focal length or polarization direction of light by electric control signals without moving the lens itself, a liquid lens using an electrowetting phenomenon, or the like. The optical unit may include a variable-focus lens array with a plurality of the variable-focus lenses. These lenses may be arranged, for example, in matrix. In this case, also, the intensity distribution of output light can be changed by changing at least one of the travelling direction and focal length of light.

Furthermore, a movable mirror array may be used as another example of the optical unit. In the case of an example shown in FIG. 5, for example, a mirror array may be used in place of the second lens array 5. The mirror array includes mirrors which can individually change the reflecting directions of the respective light beams divided by the first lens array 4 and control variations thereof. Specifically, a movable mirror array constructed of MEMS (micro-electrical machine system) mirrors arranged in matrix, such as DMD® (digital micro-mirror device) may be used. The movable mirror array reflects light from a light source and then changes the travelling direction of the light so that a light modulation device such as a liquid crystal panel is illuminated with light beams combined. The MEMS mirror array includes movable micro mirrors arranged in matrix and may be used for a semiconductor optical switch or the like. The inclination of each micro mirror can be adjusted at a high speed by electric signals. Similar to the movable lens array, the traveling direction of the incident light can be adjusted at a high speed corresponding to image signals or the like.

Figure 11:
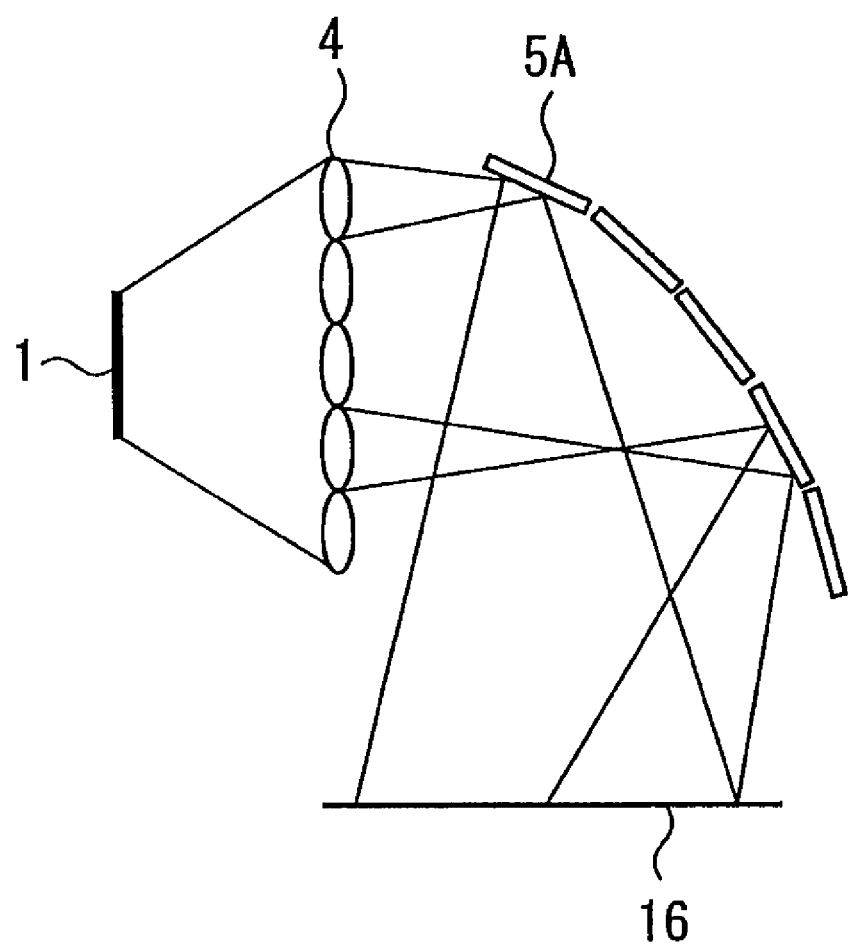
FIG. 11 is another example movable state of a mirror array in accordance with an embodiment of the present invention.

FIG. 11 illustrates another example showing a movable state of a mirror array of an optical unit according to an embodiment of the present invention. In other words, the mirror array is arranged in place of the second lens array 5. In the example shown in FIG. 11, a first lens array 4 divides light output from a light source 1 into rays of light. Then the divided light beams are reflected on the respective mirrors of a mirror array 5A. Subsequently, a light modulation device 16, such as a liquid crystal panel is illuminated with the reflected and combined light beams. The mirrors of the mirror array 5A can be moved back and forth or moved right and left or turned to allow the reflected light beams to have any intensity distribution but not uniform intensity distribution.

In this case, likewise, the first lens array 4 may be a movable lens array or variable-focus lens array. In that case, the traveling direction or combined focal length of light beams can be changed more efficiently. Therefore, the distribution of light can be more dynamically changed.

Next, the results of analyzing the respective examples of luminance distribution of light according to an embodiment of the present invention by the optical design program CODE V® are illustrated. In each example, a simulation is performed under the following conditions: each of the first and second lens arrays 4 and 5 has 25 lenses, where five per line in vertical direction and five per line in horizontal direction. The diameter of the lens is 4 mm and the focal length thereof is 5 mm.

Figure 12A:
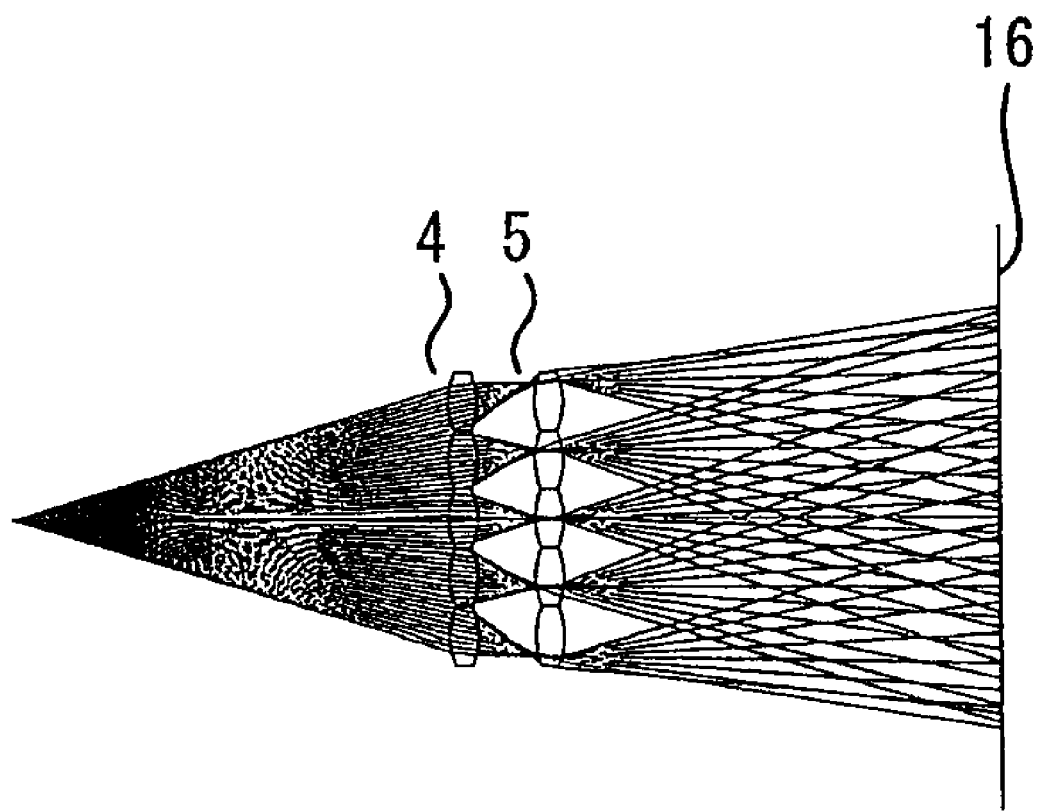
FIGS. 12A and 12B are views illustrating a first lens array and a second lens array in accordance with an embodiment of the present invention, where
Figure 12B:
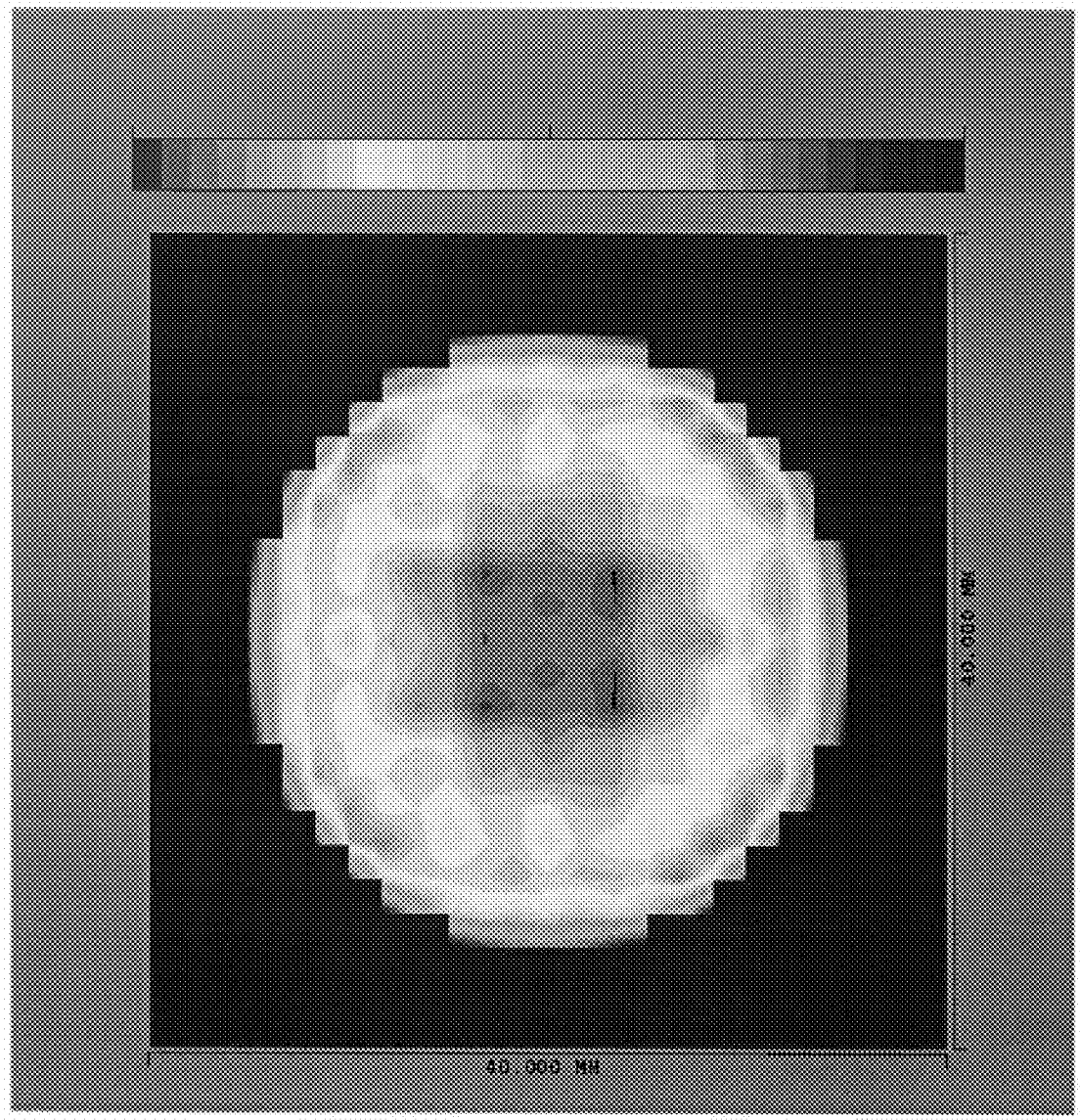

FIG. 12A illustrates an example of the arrangement of lenses and an example of beams of light output from a light source when the respective lenses of the first and second lens arrays 4 and 5 are uniformly arranged. FIG. 12B illustrates an example of the luminance distribution of light incident on the light modulation device 16 in that case. In each of FIGS. 12A and 12B, the same state as that of the related art optical unit is illustrated, where two fixed lens arrays of the related art are used. The luminance of light on the light modulation device 16 is substantially uniform.

Figure 13A:
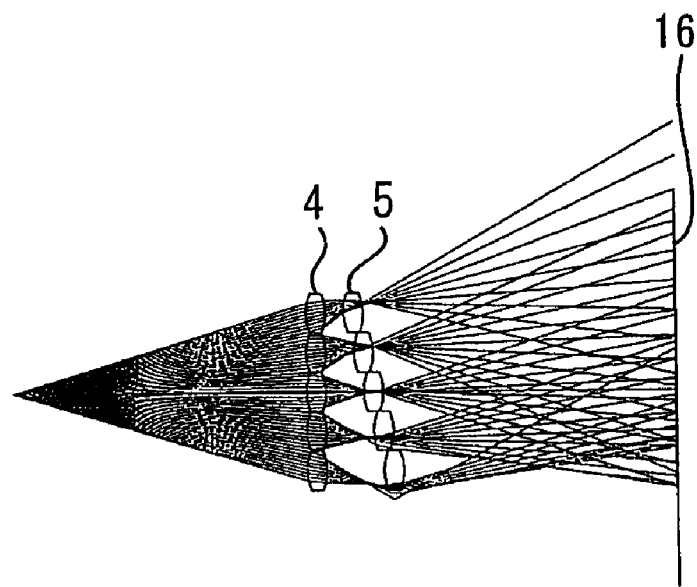
FIGS. 13A and 13B are views illustrating a first lens array and a second lens array in accordance with an embodiment of the present invention, where
Figure 13B:
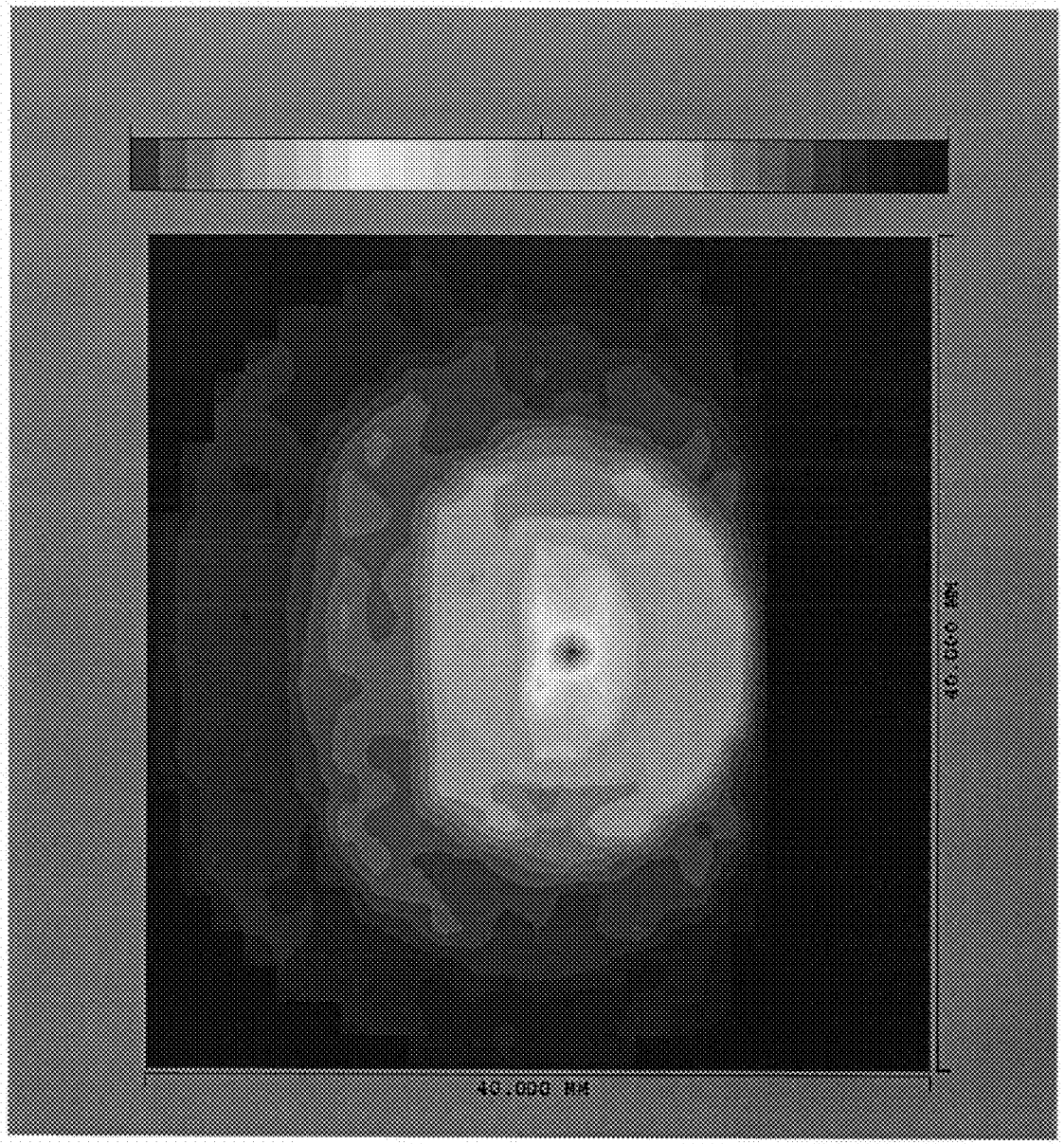

FIG. 13A illustrates an example of the arrangement of lenses and an example of beams of light output from the light source when the respective lenses of the second lens arrays 5 are moved. FIG. 13B illustrates an example of the luminance distribution of light incident on the light modulation device 16, such as a liquid crystal panel, in that case. The distribution of luminance in FIG. 13B is uneven because the arrangement of the lens array 5 is shifted and the center of the luminance distribution of light is shifted from the center of the liquid crystal panel to a position located on the lower side in the figure, so that other portions can be dark. In this manner, by allowing the lens array to be movable, the specific area alone can be made bright and other portions can be made dark.

Figure 14A:
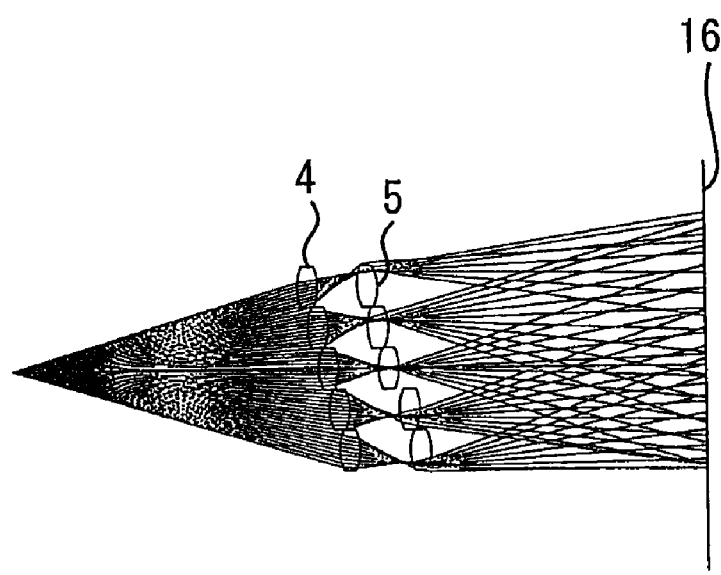
FIGS. 14A and 14B are views illustrating a first lens array and a second lens array in accordance with an embodiment of the present invention, where
Figure 14B:
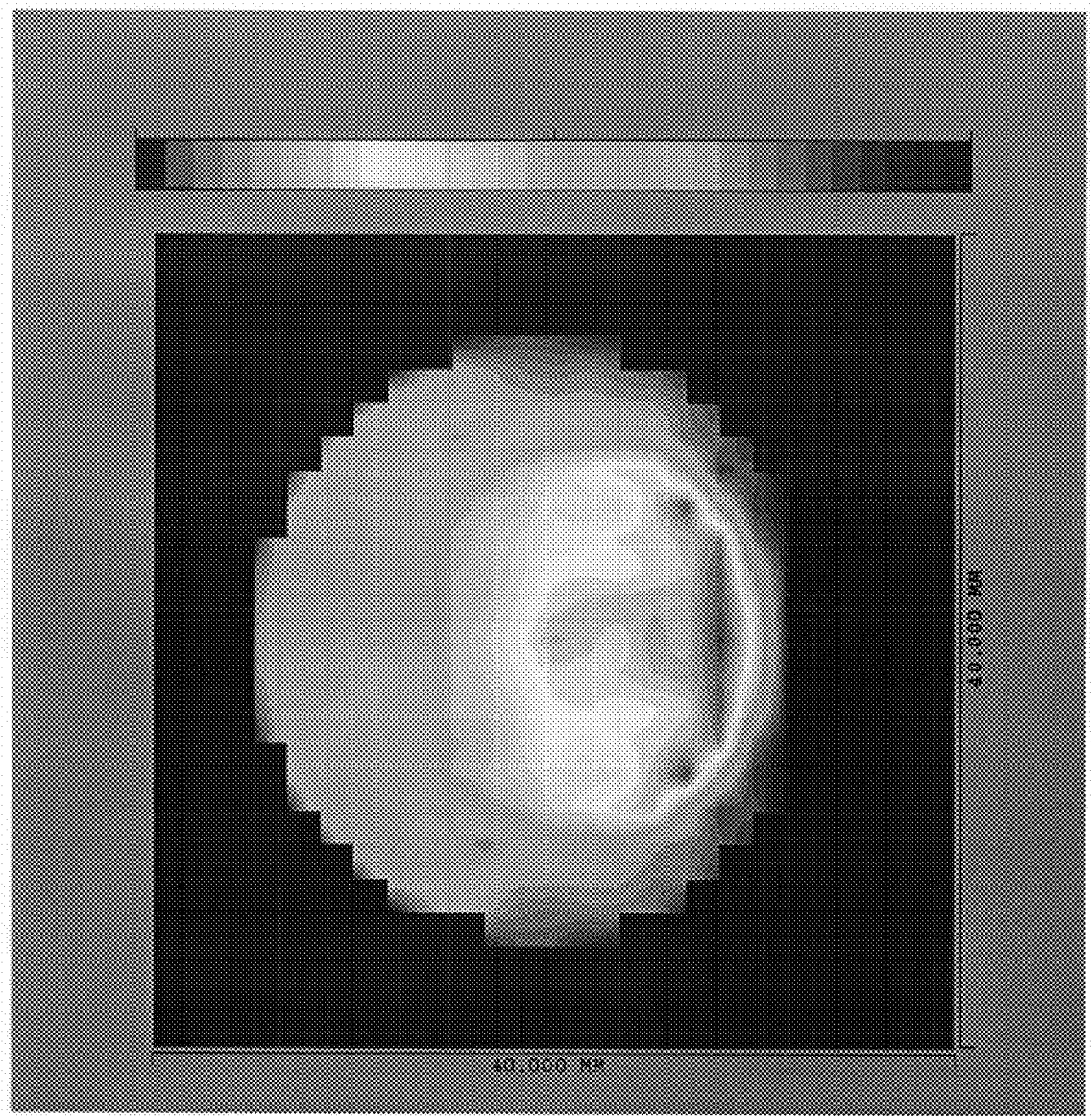
Figure 15A:
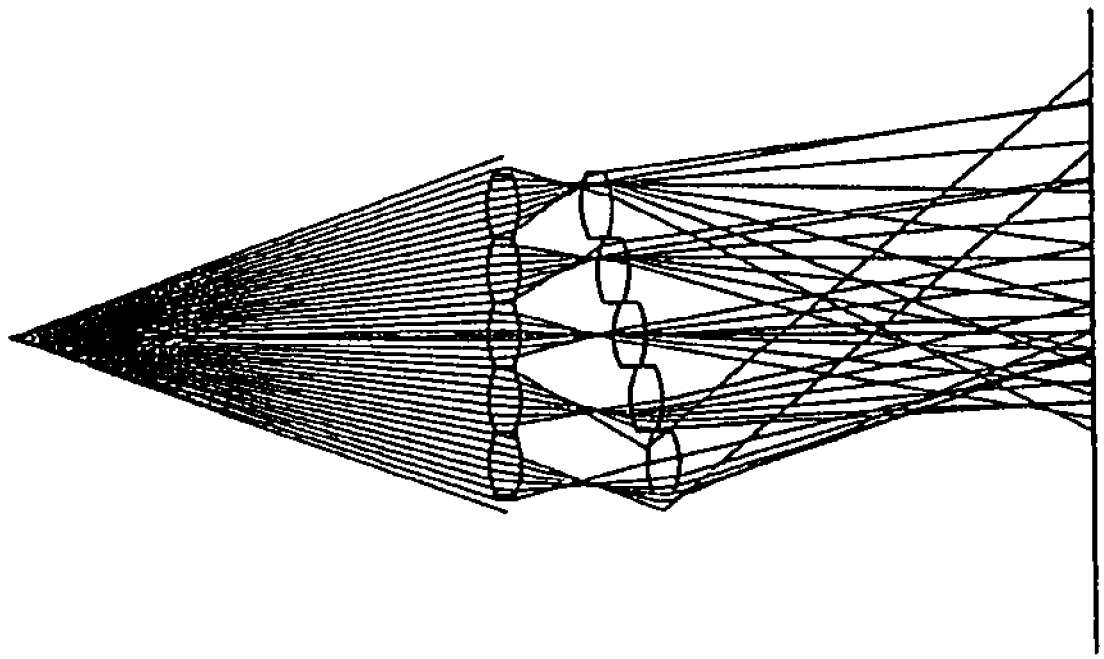
FIGS. 15A and 15B are views illustrating a first lens array and a second lens array in accordance with an embodiment of the present invention, where
Figure 15B:
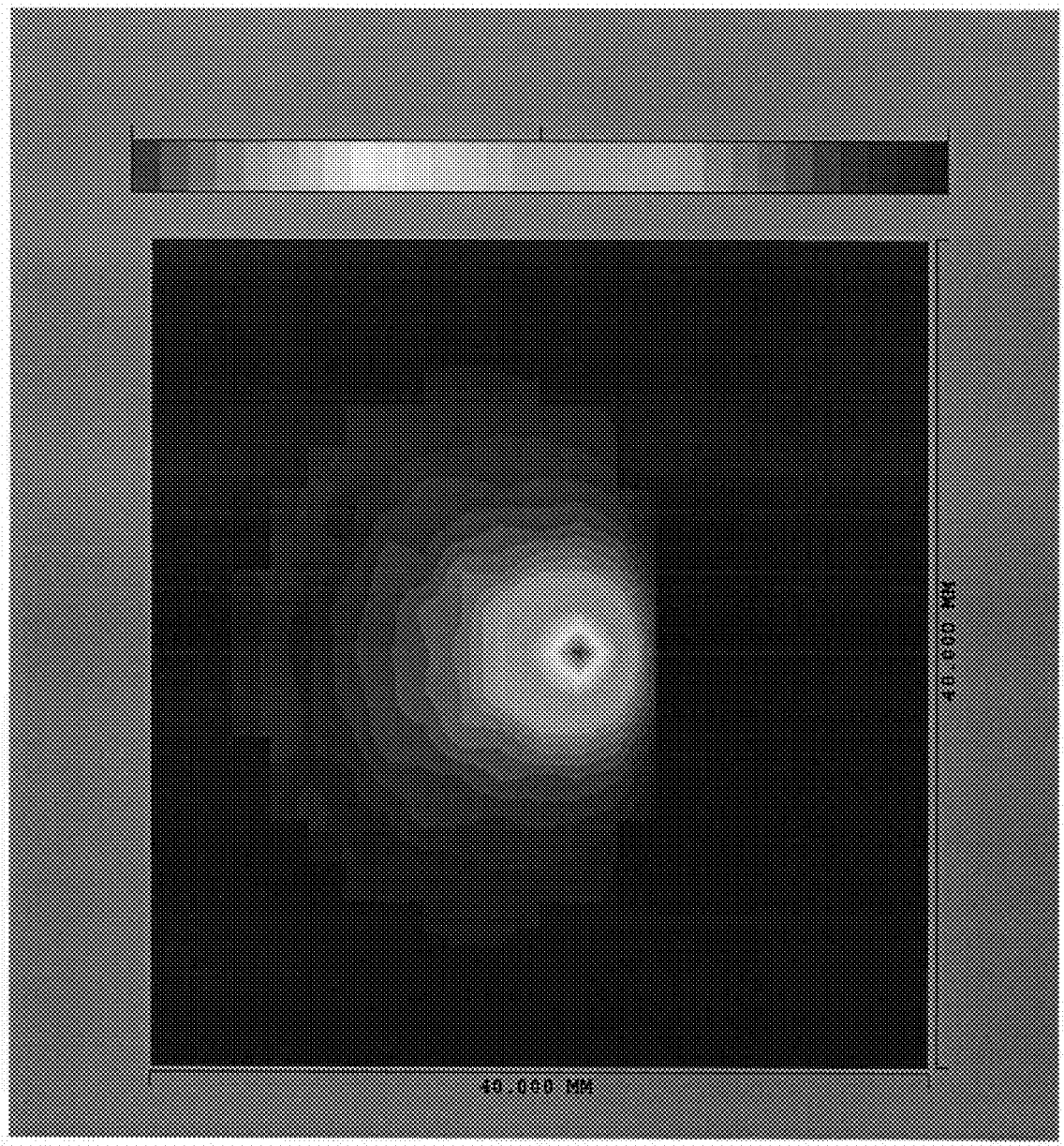
Figure 16:
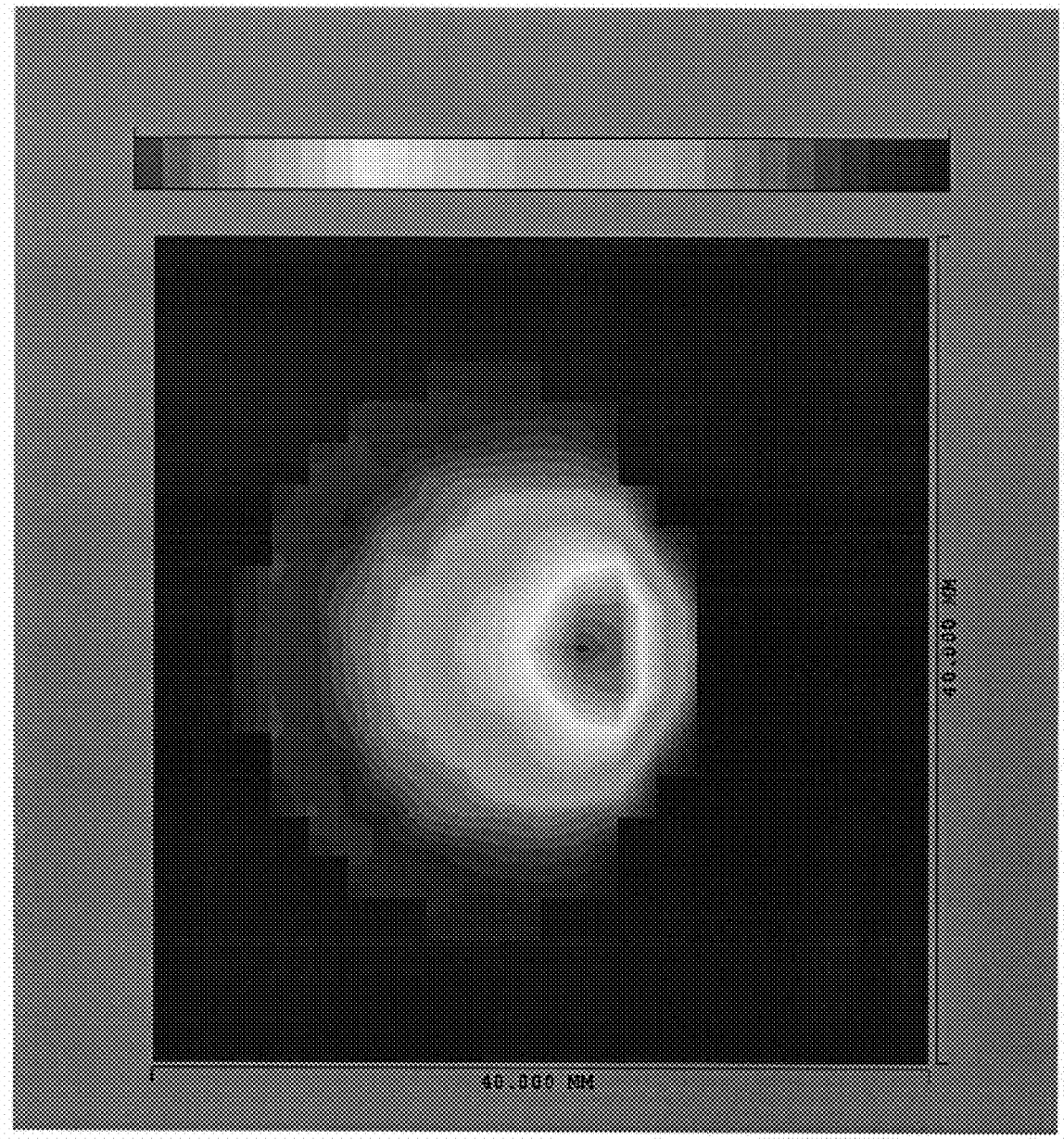
FIG. 16 is a view illustrating another example of luminance distribution in accordance with an embodiment of the present invention.

FIG. 14A illustrates an example of the arrangement of lenses and an example of beams of light output from the light source when both the first lens array 4 and the lens array 5 are movable. FIG. 14B illustrates an example of the luminance distribution of light incident on the light modulation device 16 in that case. Similar to the case where only the second lens array 5 is shifted, the lower portion of the liquid crystal panel is brighter than other portions. In this example, furthermore, the area with high luminance may not concentrate on one place. The deviation of bright portion extends to a wider area. As shown in FIGS. 15 and 16, any other luminance distributions may be provided. FIGS. 15A and 15B illustrate an example in which the entire liquid crystal panel is comparatively dark. FIG. 16 illustrates an example in which the lower part of the liquid crystal panel is comparatively bright and the upper part thereof is comparatively dark.

According to an embodiment of the present invention, as shown in any of these examples, light is distributed on the respective portions at different levels of luminance and the light is intensively incident on the comparatively-bright portion to keep the whole luminance at constant, while allowing the light to be applied with desired light distribution. Therefore, the efficiency of using the light can be improved.

Next, an example of the luminance distribution when the screen is designed in large will be described, where two or more projectors are placed side by side and images are then projected while being partially overlapped.

Figure 1:
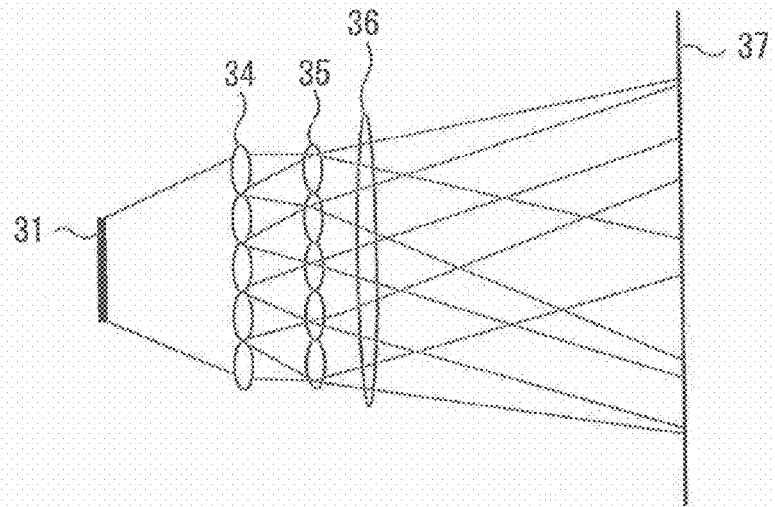
FIG. 1 is a schematic view illustrating an example configuration of a related-art integrator optical system.
Figure 2:
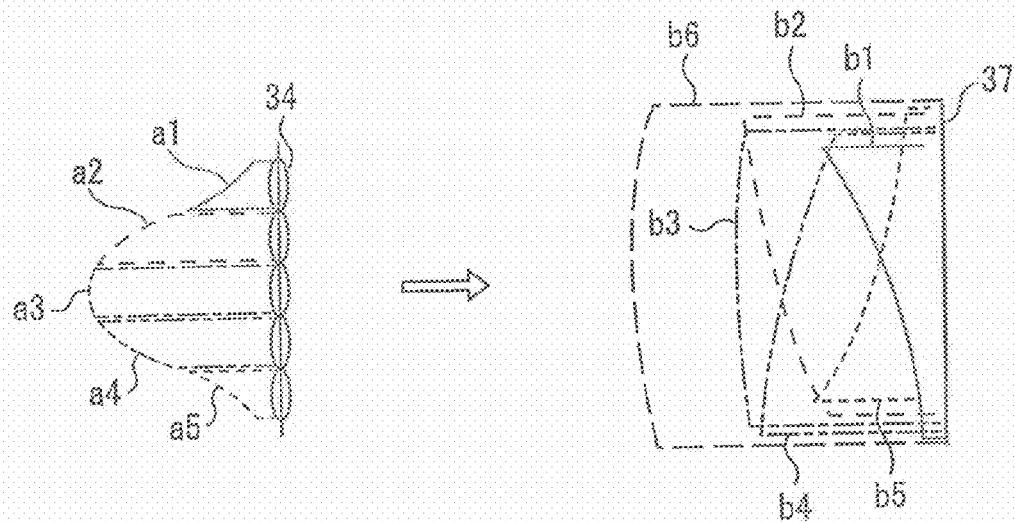
FIG. 2 is a schematic view illustrating an example light intensity distribution of the related-art integrator optical system.
Figure 3:
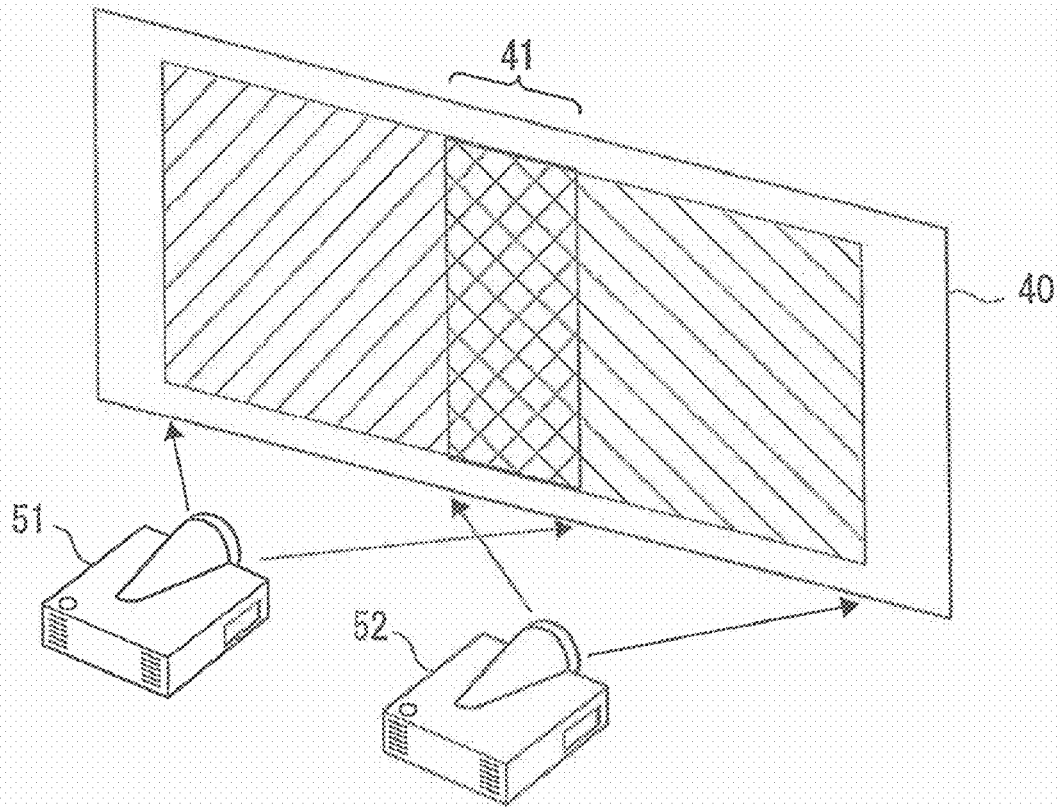
FIG. 3 is a schematic view illustrating an example of projection in the related art.
Figure 17:
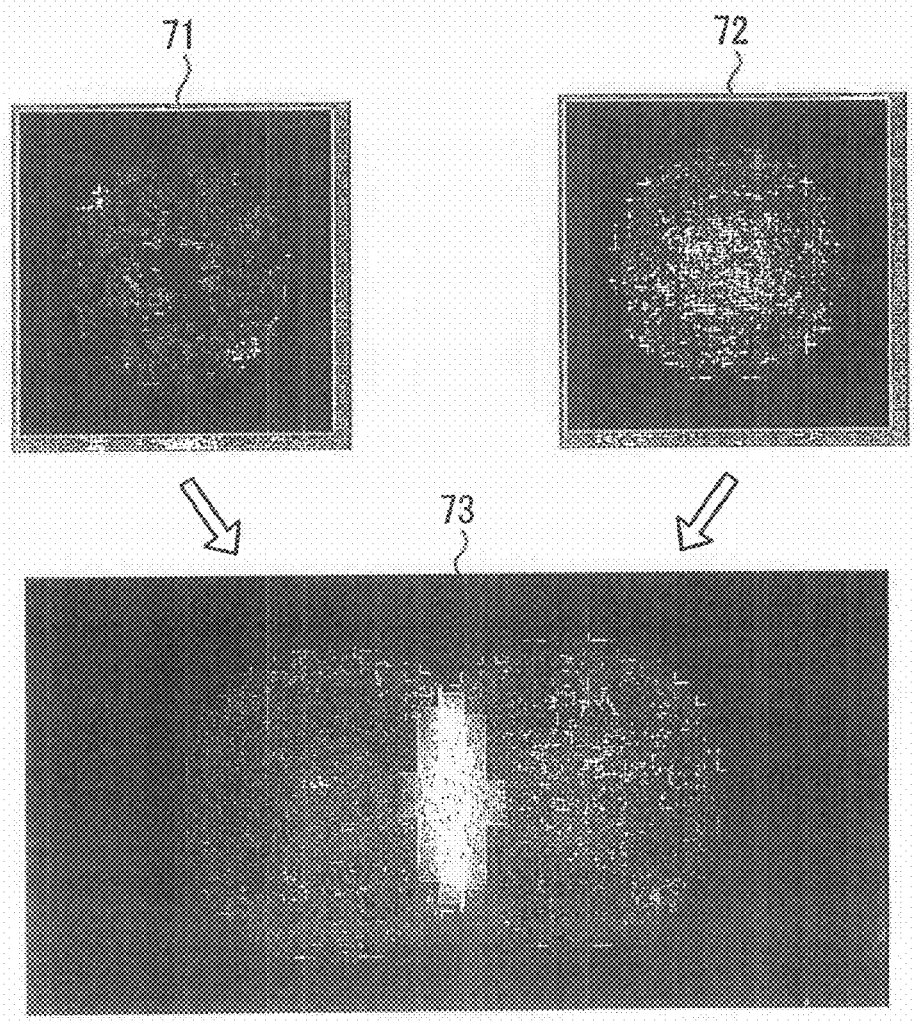
FIG. 17 is a view illustrating an example of blending in the related art.

FIG. 17 illustrates examples of luminance distributions 71 and 72 of images of the respective image projecting apparatuses and luminance distribution 73 of images partially overlapped with each other while keeping the luminance of each image projecting apparatus uniform. As already described referring to FIGS. 3 and 4, according to the related art technology, each of the image projecting apparatuses carries out the processing such that part of light is shaded on the blending portion to have the uniform luminance.

Figure 18:
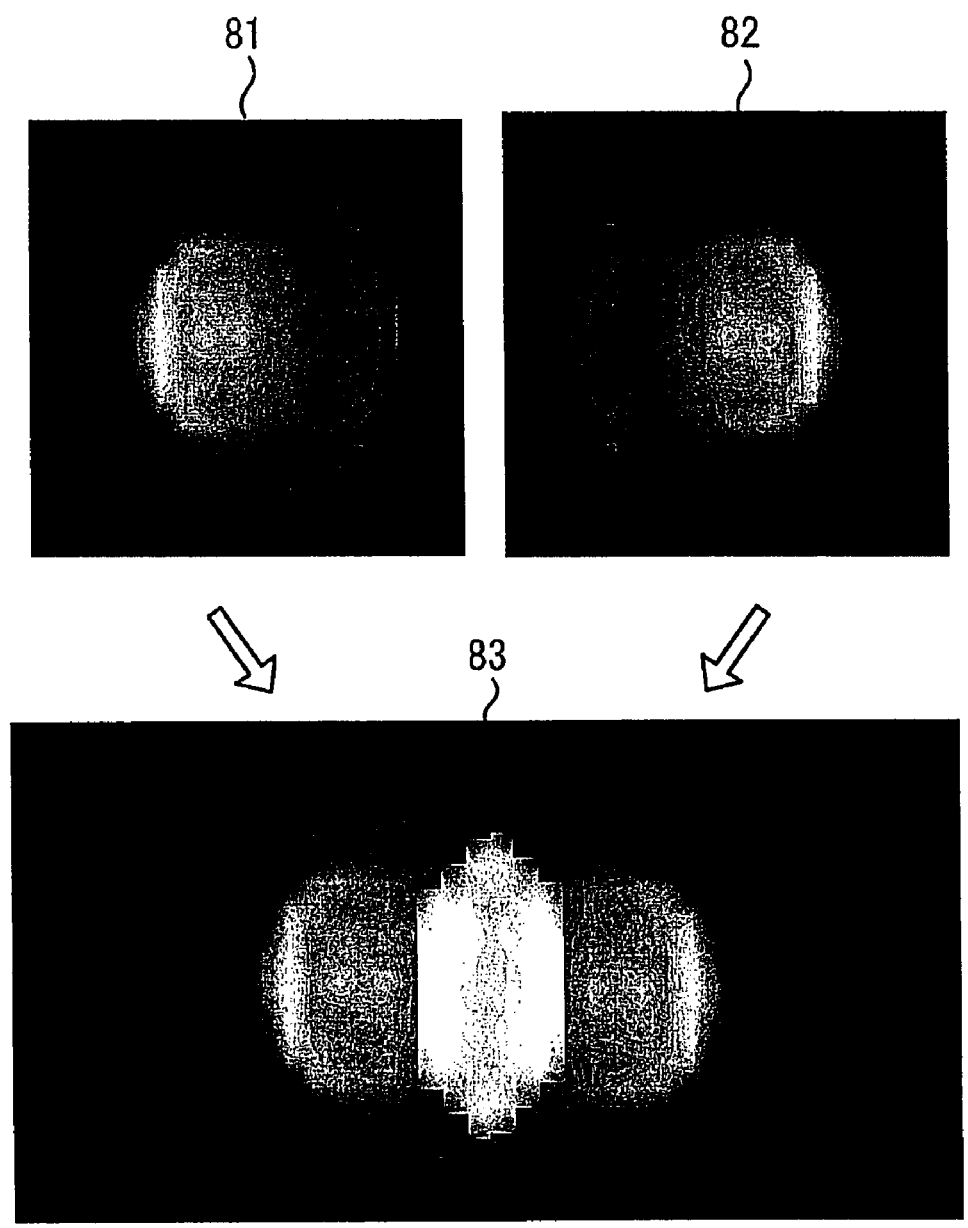
FIG. 18 is a view illustrating an example of blending in accordance with an embodiment of the present invention.

In contrast, FIG. 18 illustrates an example of the luminance distribution when an image projecting apparatus according to an embodiment of the present invention is applied. In other words, FIG. 18 illustrates examples of luminance distributions 81 and 82 of images of the respective image projecting apparatuses and luminance distribution 83 of images partially overlapped with each other. In this example, the respective image projecting apparatuses output light with uneven luminance and then superimpose the images to make the luminance of the entire image uniform. Specifically, the luminance of the blending portion is processed so that it can be assigned to any of unoverlapped portions. Thus, in each luminance distribution, the blending portion becomes dark and the other portions become bright. As a result, the entire area of the image is projected with uniform luminance distribution while partially overlapping images. In addition, the efficiency of using the light can be improved, so that an image brighter than that of the related art can be obtained.

As described above, according to an embodiment to the present invention, in place of the related-art integrator optical system, the optical unit that allows the light distribution to be variable and the light-distribution control unit that controls the variation of the light distribution are provided. Thus, the embodiment of the preset invention can efficiently use the light which has been shaded in the related art because of being incident on the low-luminance portion. Therefore, luminance of the whole area of the image can be increased, so that an improvement in contrast can be attained.

Furthermore, according to an embodiment of the present invention, when the projection is carried out using two or more image projecting apparatuses placed side by side, the light to the blending portion which has been shaded in the related art can be divided and then incident on other portions. Thus, the luminance of the entire image can be increased and the contrast of the image can be similarly improved. Besides, even in the case of projecting images with two or more image projecting apparatuses placed side by side, it is not only possible to provide the light modulation device such as a liquid crystal panel with uniform luminance but also possible to control the distribution of light so that the luminance distribution can be partially uneven in the entire projected image in response to image signals.

It should be understood by those skilled in the art that various modifications, combinations, sub-combinations and alterations may occur depending on design requirements and other factors insofar as they are within the scope of the appended claims or the equivalents thereof.

What is claimed is:

1. An illuminating device, comprising:
a light source;
a dividing unit configured to divide light emitted from the light source into light beams, wherein
the dividing unit is movable along an optical axis;
an optical means for allowing at least one of a travelling direction and a focal length of the light beams divided by the dividing unit to be variable; and
a light-distribution control unit configured to control at least one of the travelling direction and focal length of the light beams by acting on the optical means.

2. The illuminating device according to claim 1, further comprising:
an optical means having functions of the dividing unit.

3. The illuminating device according to claim 1, wherein the optical means is a movable lens array.

4. The illuminating device according to claim 1, wherein the optical means is a movable mirror array.

5. The illuminating device according to claim 1, wherein the optical means is a variable-focus lens array.

6. An illuminating method comprising:
dividing, at a dividing unit movable along an optical axis, light emitted from a light source into a plurality of light beams; and
illuminating areas on an object with corresponding divided light beams, wherein
an intended light distribution is obtained by illuminating a first area of the object with light beams corresponding to a second area thereof.

7. An image projecting apparatus, comprising:
a light source;
a dividing unit configured to divide light emitted from the light source into light beams, wherein
the dividing unit is movable along an optical axis;
an optical means for allowing at least one of a travelling direction and a focal length of the light beams divided by the dividing unit to be variable;
a light-distribution control unit configured to control at least one of the travelling direction and focal length of the light beams by acting on the optical means;
a light modulation unit configured to be illuminated with the light beams output from the optical means and configured to modulate the output light beams in response to image information; and
an optical projecting unit configured to project light modulated by the light modulation unit.

8. An illuminating device, comprising:
a light source;
a dividing unit configured to divide light emitted from the light source into light beams, wherein
the dividing unit is movable along an optical axis;
an optical unit configured to allow at least one of a travelling direction and a focal length of the light beams divided by the dividing unit to be variable; and
a light-distribution control unit configured to control at least one of the travelling direction and focal length of the light beams by acting on the optical unit.

9. An image projecting apparatus, comprising:
a light source;
a dividing unit configured to divide light emitted from the light source into light beams, wherein
the dividing unit is movable along an optical axis;
an optical unit configured to allow at least one of a travelling direction and a focal length of the light beams divided by the dividing unit to be variable;
a light-distribution control unit configured to control at least one of the travelling direction and focal length of the light beams by acting on the optical unit;
a light modulation unit configured to be illuminated with light beams output from the optical unit and configured to modulate the output light beams in response to image information; and
an optical projecting unit configured to project light modulated by the light modulation unit.

* * * * *